(12) United States Patent  
Yata et al.

(10) Patent No.: US 11,634,125 B2  
(45) Date of Patent: Apr. 25, 2023

(54) DRIVE ASSISTANCE DEVICE AND DRIVE ASSISTANCE METHOD

(71) Applicant: Mitsubishi Electric Corporation, Tokyo (JP)

(72) Inventors: Masahiro Yata, Tokyo (JP); Takuya Taniguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 70 days.

(21) Appl. No.: 16/636,407

(22) PCT Filed: Sep. 15, 2017

(86) PCT No.: PCT/JP2017/033477  
§ 371 (c)(1),  
(2) Date: Feb. 4, 2020

(87) PCT Pub. No.: WO2019/053881  
PCT Pub. Date: Mar. 21, 2019

(65) Prior Publication Data  
US 2020/0198632 A1    Jun. 25, 2020

(51) Int. Cl.  
*B60W 30/095* (2012.01)  
*B60Q 9/00* (2006.01)  
*B60W 50/14* (2020.01)

(52) U.S. Cl.  
CPC ......... *B60W 30/0956* (2013.01); *B60Q 9/008* (2013.01); *B60W 50/14* (2013.01); *B60W 2420/42* (2013.01); *B60W 2420/52* (2013.01); *B60W 2420/54* (2013.01); *B60W 2554/40* (2020.02)

(58) Field of Classification Search  
CPC ............. B60W 30/0956; B60W 50/14; B60W 2554/40; B60W 2420/42; B60W 2420/52; B60W 2420/54; B60Q 9/008  
See application file for complete search history.

(56) References Cited

U.S. PATENT DOCUMENTS

2009/0271102 A1  10/2009  Inoguchi et al.  
2014/0285361 A1*  9/2014  Tippelhofer ........... G08G 1/143  
                                                   340/932.2

(Continued)

FOREIGN PATENT DOCUMENTS

CN         101589415 A     11/2009  
JP          7-198737 A      8/1995  
(Continued)

OTHER PUBLICATIONS

International Search Report (PCT/ISA/210) dated Dec. 19, 2017, issued by the International Searching Authority in counterpart International patent Application No. PCT/JP2017/033477.

(Continued)

*Primary Examiner* — Dale W Hilgendorf  
*Assistant Examiner* — Hana Lee  
(74) *Attorney, Agent, or Firm* — Sughrue Mion, PLLC; Richard C. Turner

(57) ABSTRACT

In a drive assistance device, a required space estimation unit estimates a required space which is a space required for a subject vehicle to complete a starting. A required time estimation unit calculates an estimated required time which is an estimate value of a time required to complete the starting at a time of starting the subject vehicle. A collision time estimation unit calculates an estimated collision time which is an estimate value of a time until when an obstacle reaches the required space. A start margin calculation unit calculates a start margin indicating a temporal margin for the subject vehicle to complete the starting until the obstacle reaches the required space based on the estimated required time and the estimated collision time. The notification processing unit notifies a driver of the subject vehicle of the start margin.

16 Claims, 11 Drawing Sheets

(56) References Cited

U.S. PATENT DOCUMENTS

| | | | | |
|---|---|---|---|---|
| 2015/0109444 A1* | 4/2015 | Zhang | ............... | H04N 7/188 |
| | | | | 348/148 |
| 2016/0272115 A1* | 9/2016 | Max | ............... | B60Q 9/006 |
| 2016/0339911 A1* | 11/2016 | Obayashi | ............... | B60W 30/0956 |
| 2017/0138751 A1* | 5/2017 | Martyniv | ............... | G06Q 50/30 |
| 2017/0282915 A1* | 10/2017 | Kim | ............... | B60W 30/09 |
| 2017/0369052 A1* | 12/2017 | Nagy | ............... | B60W 30/09 |

FOREIGN PATENT DOCUMENTS

| | | |
|---|---|---|
| JP | 2008-186083 A | 8/2008 |
| JP | 2015-58842 A | 3/2015 |

OTHER PUBLICATIONS

Written Opinion (PCT/ISA/237) dated Dec. 19, 2017, issued by the International Searching Authority in counterpart International patent Application No. PCT/JP2017/033477.
Communication dated Jun. 9, 2020, from the Japanese Patent Office in application No. 2019-541599.
Communication dated Jul. 27, 2021 from The State Intellectual Property Office of the P.R. of China in Machine Application No. 201780094570.3.
Communication dated Feb. 22, 2022 from the Chinese Patent Office in Chinese Application No. 201780094570.3.
Communication dated Jun. 13, 2022 from the Chinese Patent Office in Chinese Application No. 201780094570.3.

* cited by examiner

DRIVE ASSISTANCE DEVICE AND DRIVE ASSISTANCE METHOD

TECHNICAL FIELD

The present invention relates to a drive assistance device of a vehicle, and particularly to a drive assistance at a time of starting a vehicle.

BACKGROUND ART

Known is a drive assistance device performing a drive assistance to avoid a collision of a vehicle with an obstacle. For example, Patent Document 1 described below discloses a drive assistance device performing an operation of raising an alarm over a driver or controlling a vehicle to avoid a collision with an obstacle which is a moving body, for example, when the obstacle is detected in a traveling direction of the vehicle. The drive assistance device in Patent Document 1 determines a possibility of collision with the obstacle in accordance with a travel state of the vehicle and a positional relationship with the obstacle, and raises an alarm or performs a brake control (automatic brake) in accordance with a degree of possibility.

PRIOR ART DOCUMENTS

Patent Documents

Patent Document 1: Japanese Patent Application Laid-Open No. 7-198737

SUMMARY

Problem to be Solved by the Invention

When a vehicle is started from a garage or a parking slot, a time required to start the vehicle differs depending on a start position of the vehicle or a technique of a driver. For example, it takes a longer time to start the vehicle than usual when the driver is an inexperienced beginner or the start position of the vehicle is unfamiliar to the driver.

In the technique in Cited Document 1, such a change of the time required to start the vehicle is not considered. Thus, there is a possibility, for example, that the obstacle located far away at the time of starting the vehicle gets close to the vehicle while the drive has trouble starting moving the vehicle, and the alarm is often raised or brake control is often performed. In such a case, a mental and physical burden is imposed on the driver and a passenger.

The present invention therefore has been made to solve the above problems, and it is an object of the present invention to provide a drive assistance device capable of assisting a drive when a vehicle is started in consideration of a change of a time required to start the vehicle.

Means to Solve the Problem

A drive assistance device according to claim 1 of the present invention includes: a required space estimation unit for estimating a required space which is a space required for a subject vehicle to complete a starting at a time of starting the subject vehicle; a required time estimation unit for calculating an estimated required time which is an estimate value of a time required for the subject vehicle to complete the starting at the time of starting the subject vehicle; an obstacle detection unit for detecting an obstacle around the subject vehicle; a collision time estimation unit for calculating an estimated collision time which is an estimate value of a time until when the obstacle reaches the required space; a start margin calculation unit for calculating a start margin indicating a temporal margin for the subject vehicle to complete the starting until the obstacle reaches the required space based on the estimated required time and the estimated collision time; and a notification processing unit for notifying a driver of the subject vehicle of the start margin.

A drive assistance device according to claim 4 of the present invention includes: a required space estimation unit for estimating a required space which is a space required for a subject vehicle to complete a starting at a time of starting the subject vehicle; a required time estimation unit for calculating an estimated required time which is an estimate value of a time required for the subject vehicle to complete the starting at the time of starting the subject vehicle; an obstacle detection unit for detecting an obstacle around the subject vehicle; a collision time estimation unit for calculating an estimated collision time which is an estimate value of a time until when the obstacle reaches the required space; a start margin calculation unit for calculating a start margin indicating a temporal margin for the subject vehicle to complete the starting until the obstacle reaches the required space based on the estimated required time and the estimated collision time; and a start control unit for controlling an operation for the starting of the subject vehicle based on the start margin.

Effects of the Invention

According to the drive assistance device according to claim 1 of the present invention, the driver is notified of the start margin calculated from the estimated required time (an estimate value of a time required to complete the starting) and the estimated collision time (an estimate value of a time required for the obstacle to reach the required space). For example, in a case where the driver is an inexperienced beginner or the driver starts the vehicle at a position unfamiliar to the driver, the driver is notified of the start margin which is estimated low in advance, thus an unexpected alarm and vehicle brake are reduced. As a result, a mental and physical burden imposed on the driver and the passenger is reduced.

According to the drive assistance device according to claim 4 of the present invention, the start operation of the subject vehicle is controlled in accordance with the start margin calculated from the estimated required time and the estimated collision time at the time of starting the subject vehicle. For example, when the start margin is small and there is a possibility of collision of the obstacle with the subject vehicle, the start operation of the subject vehicle is suppressed, thus the collision can be avoided. In the case where the driver is the inexperienced beginner or the driver starts the vehicle at the position unfamiliar to the driver, for example, the start margin is estimated low, thus the control with the sufficient margin is performed. Thus, the control such as a sudden braking performed by the travel control system 6 during the start operation of the subject vehicle can be avoided, and the mental and physical burden imposed on the driver and the passenger is reduced.

These and other objects, features, aspects and advantages of the present invention will become more apparent from the following detailed description of the present invention when taken in conjunction with the accompanying drawings.

DESCRIPTION OF EMBODIMENT(S)

Embodiment 1

Figure 1:
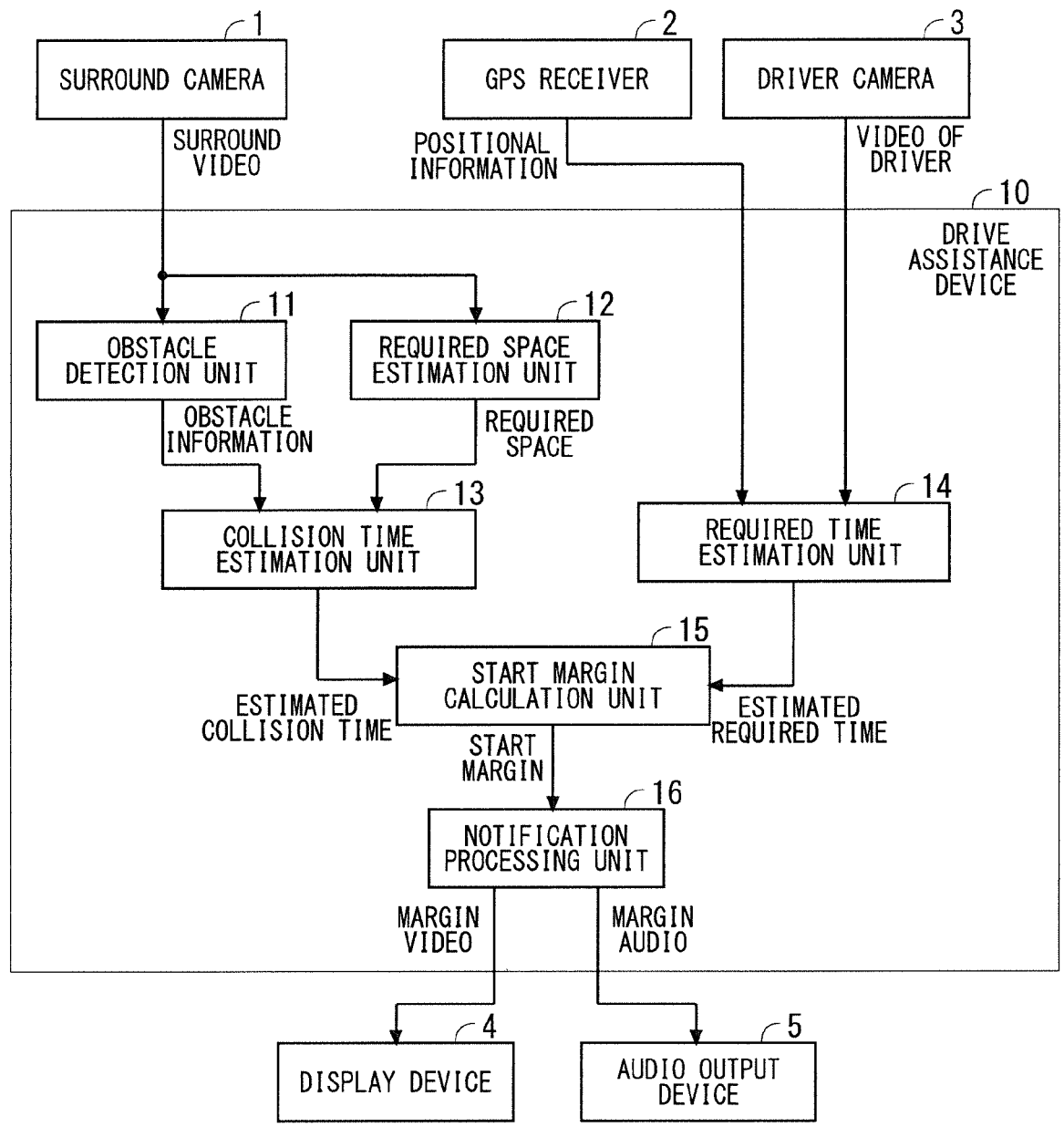
FIG. 1 A drawing illustrating a configuration of a drive assistance system including a drive assistance device according to an embodiment 1.

FIG. 1 is a drawing illustrating a configuration of a drive assistance system including a drive assistance device 10 according to an embodiment 1. A drive assistance system in FIG. 1 includes the drive assistance device 10 and a surround camera 1 connected thereto, a global positioning system (GPS) receiver 2, a driver camera 3, a display device 4, and an audio output device 5. A vehicle on which the drive assistance system is mounted is referred to as "the subject vehicle" hereinafter.

The surround camera 1 can take a surround image viewed from the subject vehicle, and takes at least an image in a direction in which the subject vehicle starts. That is to say, the surround camera 1 takes at least an image in front of the subject vehicle when the subject vehicle starts forward, and takes at least an image in back of the subject vehicle when the subject vehicle starts backward. However, the surround camera 1 has a horizontal angle of view approximately equal to 180°. Thus, the surround camera 1 can also take an image ranging approximately 20 m or more on the right and left sides of the subject vehicle while taking an image in front or back of the subject vehicle.

The GPS receiver 2 calculates a current position (latitude and longitude) of the subject vehicle based on a positioning signal received from a GPS satellite. The driver camera 3 takes an image of a face of a driver of the subject vehicle, and is disposed near a driver seat of the subject vehicle.

The display device 4 displays an image to provide the driver with information, and is made up of the liquid crystal display device, for example. The display device 4 is disposed near the driver seat of the subject vehicle so that the driver can see it easily. The audio output device 5 is a speaker outputting audio to provide the driver with the information. The audio output device 5 is disposed in a vehicle interior of the subject vehicle so that the driver can hear the output audio easily.

As illustrated in FIG. 1, the drive assistance device 10 includes an obstacle detection unit 11, a required space estimation unit 12, a collision time estimation unit 13, a required time estimation unit 14, a start margin calculation unit 15, and a notification processing unit 16.

The obstacle detection unit 11 detects an obstacle obstructing a subject vehicle at the time of starting the subject vehicle from an image (surround image) taken by the surround camera 1. The obstacle detection unit 11 also calculates a position and velocity vector of the obstacle as the information of the detected obstacle.

In the present embodiment, a pattern recognition technique is used in the obstacle detection unit 11 as a method of detecting the obstacle. An object which can be an obstacle, such as a pedestrian, the other vehicle, and trees, can be detected from the surround image by using the pattern recognition technique. It is also applicable to detect the obstacle based on depth information obtained from a motion stereo or by clustering an optical flow in place of using the pattern recognition.

The obstacle detection unit 11 obtains the position and velocity vector of the detected obstacle by the following procedure.

Firstly, a relative position of the obstacle with respect to the surround camera 1 is calculated from a position of the obstacle included in the image taken by the surround camera 1. The position and a posture of the surround camera 1 is already known, thus the relative position of the obstacle with respect to the subject vehicle can be recognized by performing an inversion projection conversion on the image taken by the surround camera 1. Subsequently, the obstacle detection unit 11 estimates and calculates the relative position of the subject vehicle with respect to a start position of the subject vehicle from a control signal of the subject vehicle. Then, a temporal differentiation is performed on each of the relative position of the obstacle with respect to the subject vehicle and the relative position of the subject vehicle with respect to the start position of the subject vehicle, thus a velocity vector of the obstacle is obtained.

In the present embodiment, the surround camera 1 is used as a sensor detecting the obstacle, however, a milliwave radar or a sonar can also be used, for example. In such a case, the obstacle detection unit 11 can calculate the position and velocity vector of the obstacle by the following procedure.

When the milliwave radar is used, a time from when milliwave emitted from the milliwave radar is reflected by the obstacle until when the milliwave returns to the milliwave radar is measured to calculate a distance to the obstacle. When the sonar is used, a time from when ultrasonic wave emitted from the sonar is reflected by the obstacle until when the ultrasonic wave returns to the sonar is measured to calculate a distance to the obstacle. An emission angle of the milliwave or the ultrasonic wave is already known, thus the relative position of the obstacle with respect to the subject vehicle can be recognized.

Subsequently, the obstacle detection unit 11 estimates and calculates the relative position of the subject vehicle with respect to the start position of the subject vehicle from the control signal of the subject vehicle in the manner similar to the case of using the surround camera 1. Then, a temporal differentiation is performed on each of the relative position of the obstacle with respect to the subject vehicle and the relative position of the subject vehicle with respect to the start position of the subject vehicle, thus a velocity vector of the obstacle is obtained.

When the milliwave radar or the sonar is used as the obstacle detection sensor, all of the object detected by the sensor may be determined to be the obstacle, however, it is also applicable that only the object having a speed is determined to be the obstacle.

Figure 2:
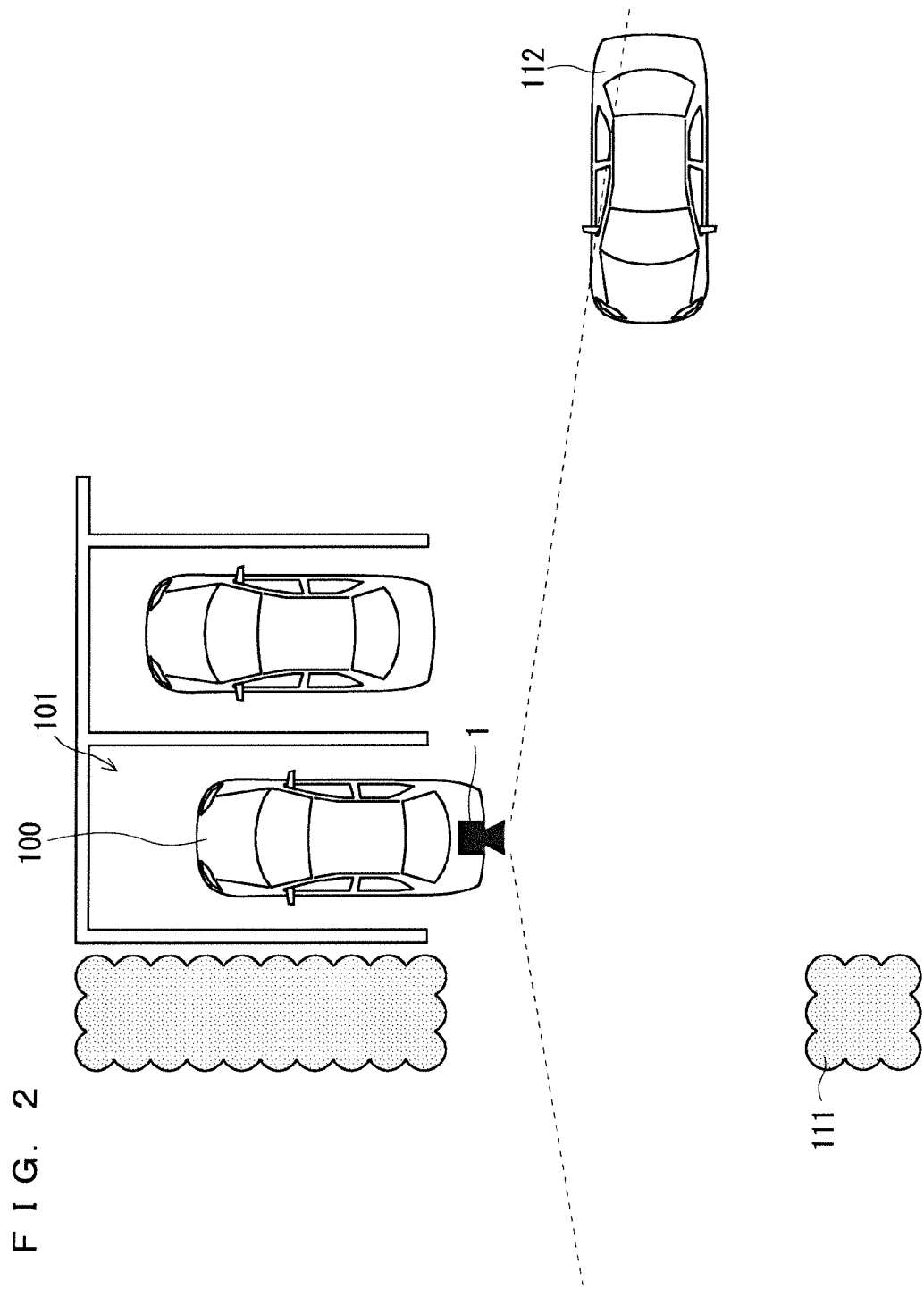
FIG. 2 A drawing illustrating an example of a state of starting a subject vehicle.
Figure 3:
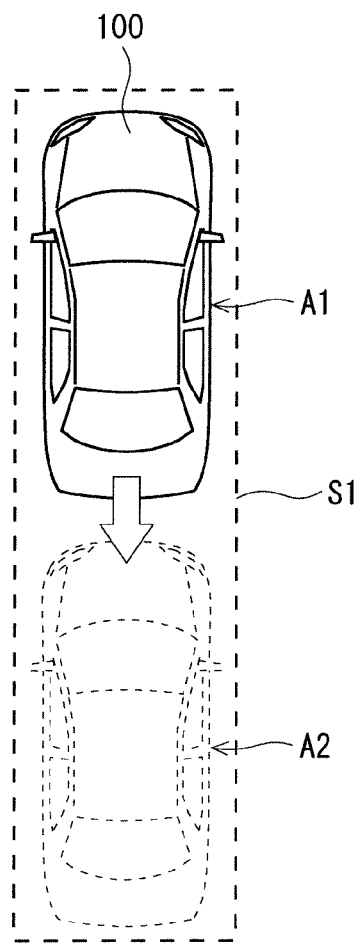
FIG. 3 A drawing illustrating an example of a required space to start the subject vehicle.

The required space estimation unit 12 estimates "a required space" which is a space required for the subject vehicle to complete the starting at the time of starting the subject vehicle. For example, in a state where a subject vehicle 100 stopping in a parking slot 101 of a parking area starts backward to get out of the parking slot 101 as illustrated in FIG. 2, the required space estimation unit 12 assumes a position located backward from a start position A1 of the subject vehicle 100 by a length equal to that of one subject vehicle 100 as a start completion position A2 as illustrated in FIG. 3. The start completion position A2 is preferably a position where the obstacle can be visually recognized from the subject vehicle sufficiently or a position where the subject vehicle can be visually recognized from the obstacle sufficiently.

Then, the required space estimation unit 12 estimates a sweep space for the subject vehicle 100 ranging from the current position to the start completion position A2 as a required space S1. At this time, it is also applicable that a space of extending the sweep space by several cm around the sweep space is set to the required space S1 to increase safety. Since the subject vehicle is not always located in the same position when completing the starting, it is also applicable, based on a plurality of start completion position A2, to set a space including all of the sweep spaces ranging thereto as the required space S1.

When the obstacle detection unit 11 detects the obstacle, the collision time estimation unit 13 calculates, from a moving vector of the obstacle and the position of the required space, "an estimated collision time" which is an estimate value of a time until when the obstacle reaches the required space of the subject vehicle. When the obstacle detection unit 11 detects a plurality of obstacles, the collision time estimation unit 13 calculates a time until when the plurality of obstacles reach the required space of the subject vehicle for each of the plurality of obstacles, and sets a minimum value in the calculated time to the estimated collision time.

In the meanwhile, when the obstacle is not detected or the detected obstacle does not move (magnitude of the moving vector is zero), the collision time estimation unit 13 determines that there is no possibility that the obstacle reaches the required space of the subject vehicle, and sets the estimated collision time to have an infinite value.

The required time estimation unit 14 calculates "an estimated required time" which is an estimate value of a time required for the subject vehicle to complete the starting at the time of starting the subject vehicle.

Figure 4:
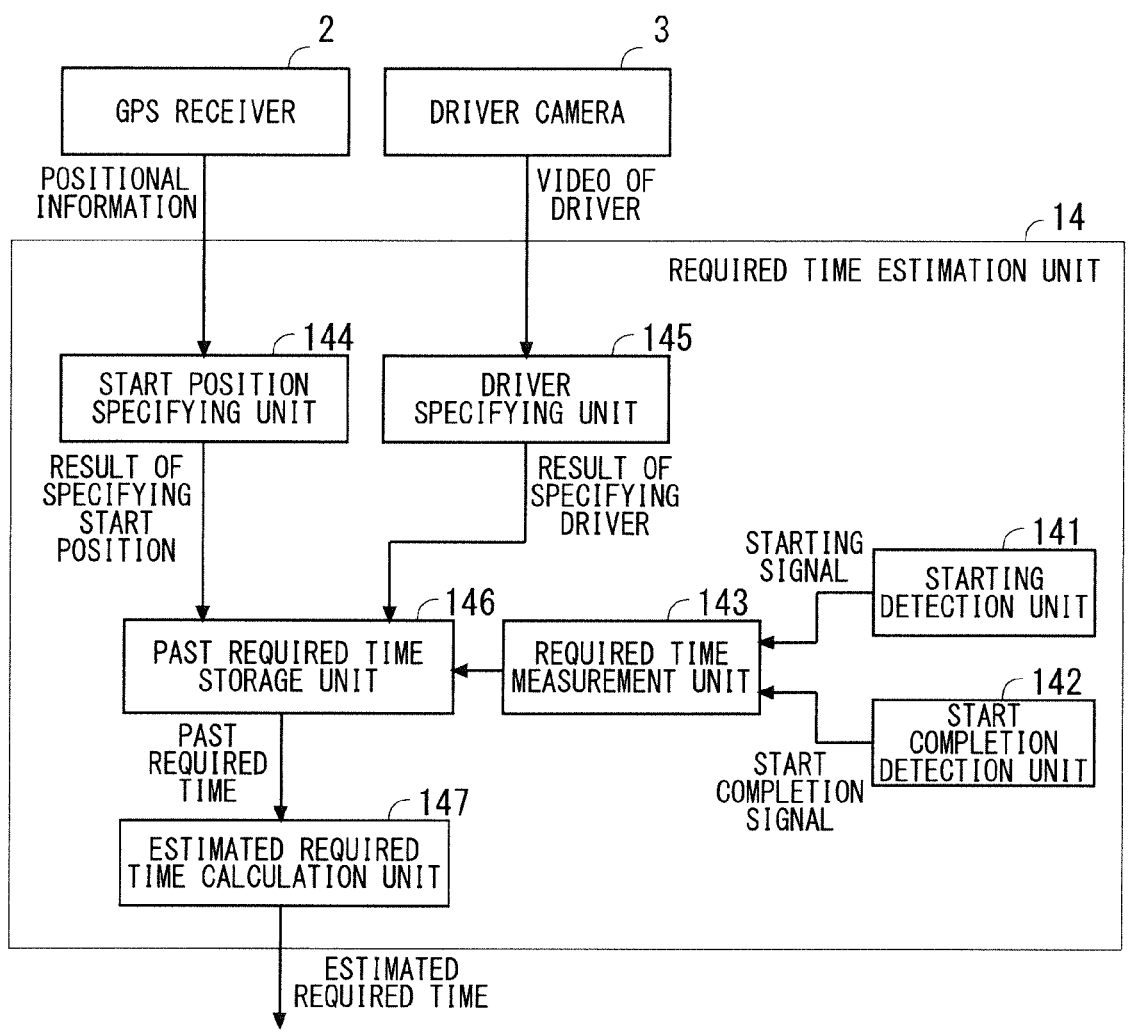
FIG. 4 A drawing illustrating a configuration of a required time estimation unit of the drive assistance device.

FIG. 4 is a drawing illustrating a configuration of the required time estimation unit 14. As illustrated in FIG. 4, the required time estimation unit 14 includes a starting detection unit 141, a start completion detection unit 142, a required time measurement unit 143, a start position specifying unit 144, a driver specifying unit 145, a past required time storage unit 146, and an estimated required time calculation unit 147.

The starting detection unit 141 detects that the subject vehicle starts moving, and outputs a signal indicating that the subject vehicle starts moving (starting signal). Considered as a method of detecting the starting of the subject vehicle is, for example, a method of monitoring an operation of the subject vehicle performed by the driver to detect a state where a shift lever of the stopping subject vehicle is set to forward (D) or backward (R) and an accelerator is pressed as the starting of the subject vehicle.

The start completion detection unit 142 detects that the starting of the subject vehicle is completed, and outputs a signal indicating that the starting of the subject vehicle is completed (start completion signal). Considered as a method of detecting that the starting of the subject vehicle is completed is, for example, a method of monitoring a position of the subject vehicle to detect a time when the position of the subject vehicle reaches the start completion position described above as the start completion.

The required time measurement unit 143 measures a time from when the starting signal is output from the starting detection unit 141 until when the start completion signal is output from the start completion detection unit 142, thereby measuring "the required time" which is a time actually required for the subject vehicle to start.

The start position specifying unit 144 specifies a position where the subject vehicle starts (that is to say, a current position when the subject vehicle starts) based on positional information obtained from the GPS receiver 2. For example, when the current position of the subject vehicle obtained from the GPS receiver 2 at the time of starting the subject vehicle is located near a garage of a home of the driver, the start position specifying unit 144 specifies the start position as the garage of the home.

The driver specifying unit 145 specifies the driver based on an image of a face of the driver taken by the driver camera 3. The driver specifying unit 145 needs not specifically specify who is the driver, but needs to specify at least whether a current driver is the same as a past driver.

The past required time storage unit 146 stores the required time measured by the required time measurement unit 143 when the starting of the subject vehicle is completed in association with a start position specified by the start position specifying unit 144 and the driver specified by the driver specifying unit 145.

The estimated required time calculation unit 147 calculates the estimated required time in the starting at this time based on the past required time stored in the past required time storage unit 146 when the subject vehicle starts moving. That is to say, when the subject vehicle starts moving, the estimated required time calculation unit 147 reads out the start position specified by the start position specifying unit 144 at that time and the past required time stored in association with the driver specified by the driver specifying unit 145 from the past required time storage unit 146, and calculates the estimated required time in the current starting using the following equation (1), for example.

[Formula 1]

$$T_d' = \sum_{k=1}^{N} \alpha(1-\alpha)^{k-1} \cdot T_k \quad (1)$$

The equation (1) is a calculation formula for calculating an estimated required time $T_d'$ as a weighted average value of past N required times $T_k$ ($k=1, 2, \ldots, N$). A weight of the latest required time $T_k$ is largest, and the earlier required time $T_k$ has a smaller weight. $\alpha$ is an optional constant number satisfying $0 < \alpha \leq 1$, and an actual value thereof may be experimentally obtained. All of the past required times may be used as the past required time used for calculating the estimated required time, or the latest several required times may also be used.

As described above, in the present embodiment, the estimated required time is calculated based on the past required time in association with the current driver and the start position (that is to say, the past required time on the current driver). Accordingly, contributed to the estimated required time is a state whether the driver is accustomed to the operation of the subject vehicle and a current garage environment.

In the meanwhile, when the past required time storage unit 146 stores no past required time which can be used for calculating the estimated required time in a case where the subject vehicle starts at a new position or a new driver starts moving the subject vehicle, for example, the estimated required time calculation unit 147 uses a value predetermined as a general required time as the estimated required time. In such a case, the driver is preferably notified that a general value is used as the estimated required time.

The estimated required time $T_d'$ obtained by the equation (1) is an estimate value of a time required from the starting to the completion of starting. The estimated required time calculation unit 147 updates the estimated required time using the following equation (2) in accordance with a progress degree of the movement while the subject vehicle moves.

[Formula 2]

$$T_d = (1-p) \cdot T_d' \qquad (2)$$

In the equation (2), p is a parameter indicating the progress degree of the movement (0≤p≤1), and is set to 0 (0%) when the subject vehicle is located in the starting position and set to 1 (100%) when the subject vehicle reaches the start completion position in accordance with the progress degree. The estimated required time $T_d$ obtained by the equation (2) is the estimate value of a remaining time until the subject vehicle halfway through starting completes the starting.

Returning to FIG. 1, the start margin calculation unit 15 calculates "the start margin" indicating a temporal margin for the subject vehicle to complete the starting until the obstacle reaches the required space based on the estimated collision time calculated by the collision time estimation unit 13 and the estimated required time calculated by the required time estimation unit 14. A start margin $T_l$ is calculated by the following equation (3) from an estimated collision time $T_c$ and the estimated required time $T_d$.

[Formula 3]

$$T_l = T_c - T_d \qquad (3)$$

When the start margin $T_l$ is positive, it is indicated that the subject vehicle can complete the starting until the obstacle reaches the required space. When the start margin $T_l$ is negative, it is indicated that there is a possibility that the obstacle reaches the required space before the subject vehicle completes the starting, and has a collision with the subject vehicle.

Figure 5:
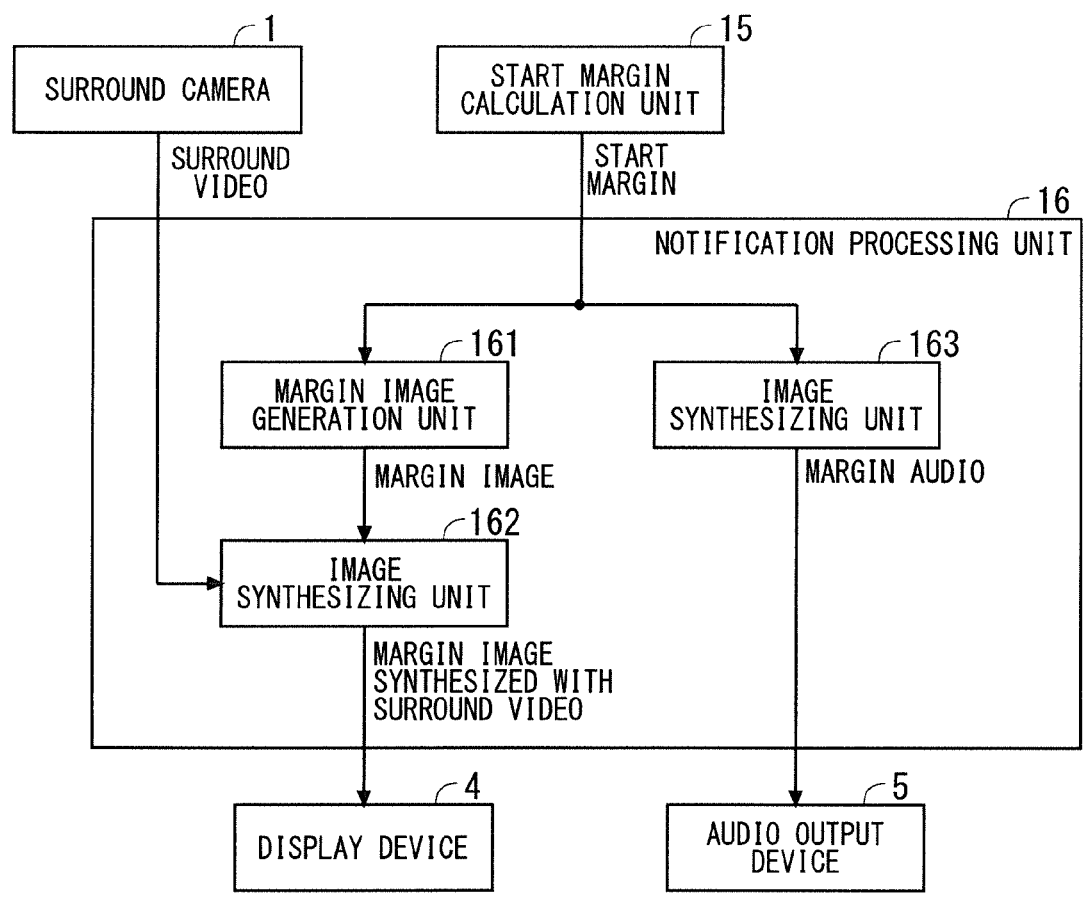
FIG. 5 A drawing illustrating a configuration of a notification processing unit of the drive assistance device.

The notification processing unit 16 notifies the driver of the subject vehicle of the start margin calculated by the start margin calculation unit 15. FIG. 5 is a drawing illustrating a configuration of the notification processing unit 16. As illustrated in FIG. 5, the notification processing unit 16 includes a margin image generation unit 161, an image synthesizing unit 162, and a margin audio generation unit 163.

The margin image generation unit 161 generates an image expressing the start margin calculated by the start margin calculation unit 15 (referred to as "the margin image" hereinafter).

The image synthesizing unit 162 synthesizes a video (surround video) taken by the surround camera 1 with the margin image generated by the margin image generation unit 161, thereby generating a video in which the margin image is displayed against a background of the surround video. The display device 4 displays the margin image synthesized with the surround video, thereby notifying the driver of the start margin.

The margin audio generation unit 163 generates an audio expressing the start margin calculated by the start margin calculation unit 15 (referred to as "the margin audio" hereinafter) and outputs the margin audio from the audio output device 5, thereby notifying the driver of the start margin.

Figure 6:
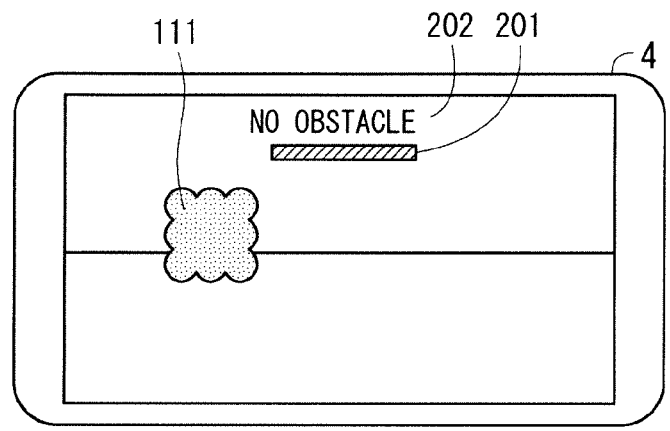
FIG. 6 A drawing illustrating an example of a notification screen of a start margin.
Figure 7:
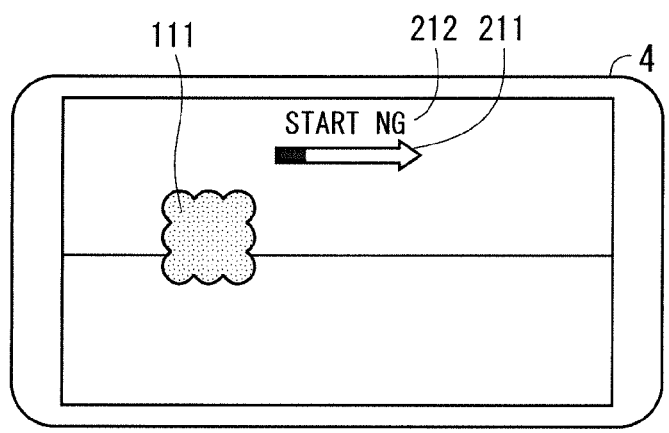
FIG. 7 A drawing illustrating an example of a notification screen of a start margin.
Figure 8:
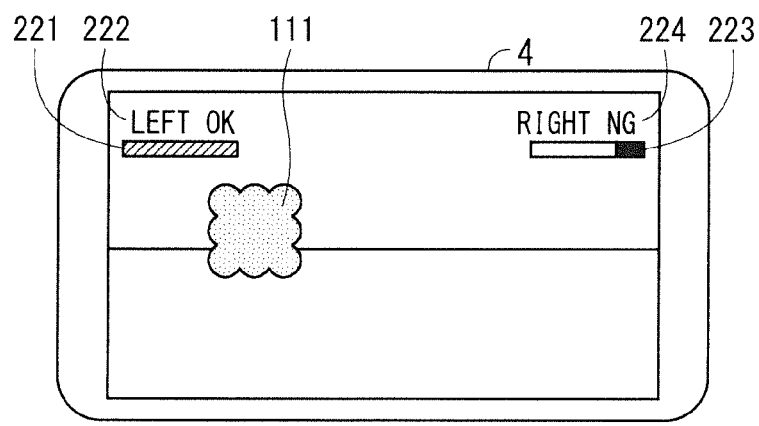
FIG. 8 A drawing illustrating an example of a notification screen of a start margin.

FIGS. 6 to 8 illustrate examples of notification screens of the start margins displayed in the display device 4. Also assumed herein is the state illustrated in FIG. 2, that is to say, the state where the subject vehicle 100 starts backward to get out of the parking slot 101 of the parking area. Herein, an image in back of the subject vehicle 100 taken by the surround camera 1 of the subject vehicle 100 is used as the background, and includes an obstacle 111, which is fixed (does not move), located in back of the subject vehicle. A dashed line illustrated in FIG. 2 indicates a horizontal angle of view of the surround camera 1.

For example, when the start margin is positive in a case where the obstacle moving toward the required space of the subject vehicle 100 is not detected, as illustrated in FIG. 6, a gauge 201 indicating that the start margin is positive and a character 202 of "NO OBSTACLE" are displayed in the display device 4 as the margin image.

For example, when a non-subject vehicle 112 traveling toward the required space of the subject vehicle 100 is detected and the start margin is negative as illustrated in FIG. 2, a gauge 211 indicating that the start margin is negative and a character 212 of "START NG" are displayed in the display device 4 as the margin image as illustrated in FIG. 7. In FIG. 7, the gauge 211 of the start margin has an arrow shape indicating a direction in which the non-subject vehicle 112 gets close to the required space.

When directions in which the driver needs to pay attention can be limited to be small in number such as a case where the obstacle gets close to the required space in only two directions of right and left, it is also applicable that the start margin calculation unit 15 separately calculates the start margin of each direction and displays the margin images each indicating the start margin of each direction in the display device 4. For example, when the start margin calculation unit 15 calculates the start margins of the two directions of right and left, it is also applicable to display a gauge 221 and a character 222 indicating the start margin on the left side and a gauge 223 and a character 224 indicating the start margin on the right side in the display device 4 as illustrated in FIG. 8.

FIGS. 6 to 8 illustrate the examples of displaying the gauges each expressing a magnitude of the start margin as the margin image, however, it is also applicable that an additive inverse of the start margin is defined as "the start riskiness" and a gauge expressing a magnitude of the start riskiness is displayed, for example.

In the meanwhile, the margin audio generation unit 163 generates an audio for promoting a suspension of starting when the start margin calculated by the start margin calculation unit 15 is small (for example, equal to or smaller than one second). The margin audio generation unit 163 may raise a tone of the audio to be generated or increase an audio volume with decrease in the start margin for purpose of notifying the driver of urgency.

Figure 9:
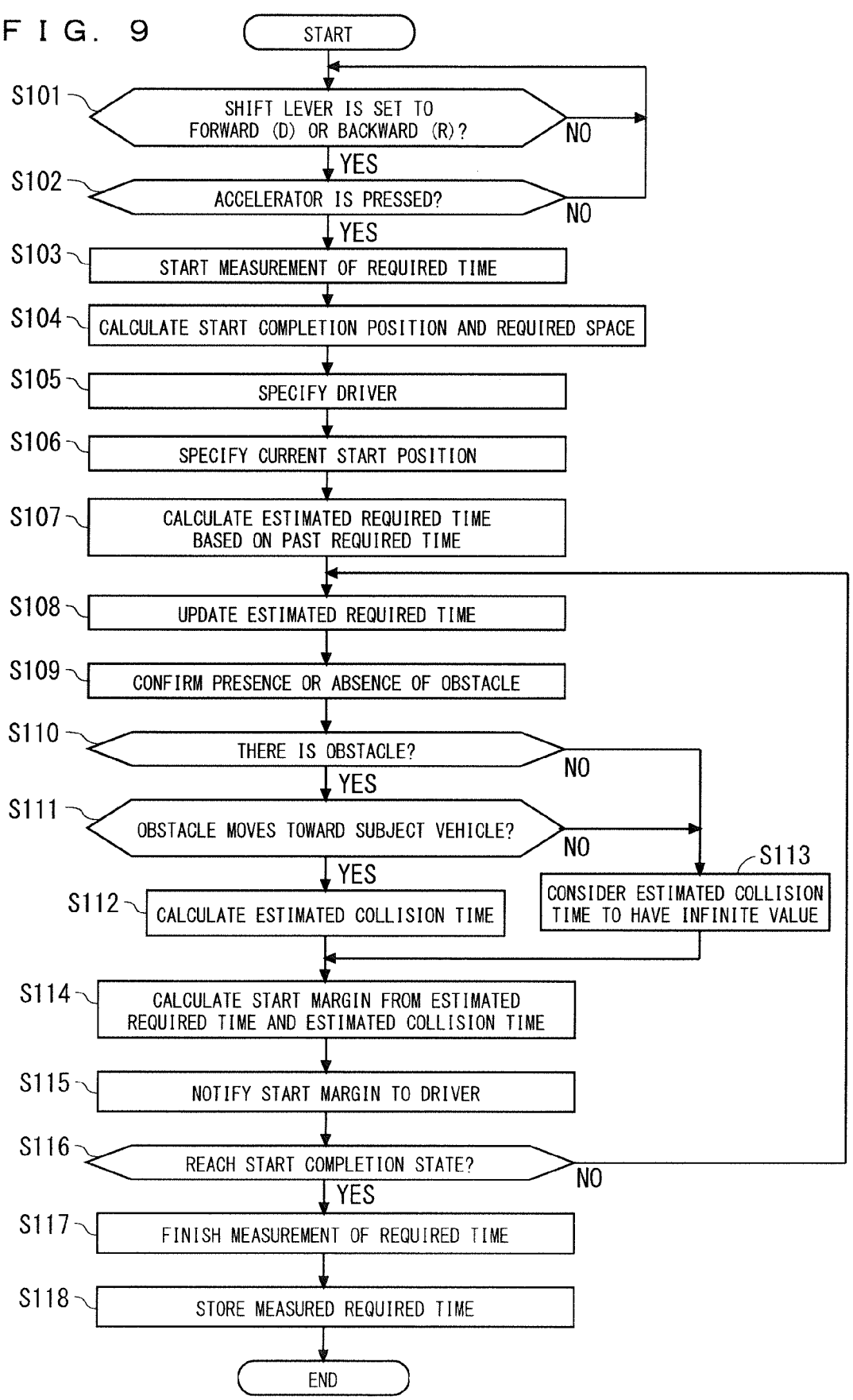
FIG. 9 A flow chart illustrating an operation of the drive assistance device according to the embodiment 1.

FIG. 9 is a flow chart illustrating an operation of the drive assistance device 10. The operation of the drive assistance device 10 is described hereinafter based on FIG. 9.

Firstly, the starting detection unit 141 of the required time estimation unit 14 monitors a state of the subject vehicle, and determines whether or not the subject vehicle starts moving. In the present embodiment, the starting detection unit 141 monitors a shift lever and an accelerator of the subject vehicle (Steps S101 and S102). The starting detection unit 141 detects that a shift lever is set to forward (D) or backward (R) and subsequently an accelerator is pressed (YES in both Steps S101 and S102), thereby detecting the starting of the subject vehicle.

Upon detecting the starting of the subject vehicle, the starting detection unit 141 outputs the starting signal to the required time measurement unit 143. In accordance with this, the required time measurement unit 143 starts measuring the required time (Step S103). The required space estimation unit 12 calculates the start completion position of the subject vehicle based on the video around the subject vehicle taken by the surround camera 1, and further calculates the required space in accordance with the starting position and the start completion position of the subject vehicle (Step S104).

Subsequently, the driver specifying unit 145 specifies the current driver in accordance with the video of the face of the driver taken by the driver camera 3 (Step S105). The start position specifying unit 144 specifies the current start position in accordance with the positional information obtained in the GPS receiver 2 (Step S106).

Then, the estimated required time calculation unit 147 calculates the estimated required time by the equation (1) described above, for example, based on the past required time stored in the past required time storage unit 146 in association with the current start position and the driver (Step S107). The estimated required time calculated in Step S107 is the estimate value of a time required from the starting to the completion of movement.

Next, the estimated required time calculation unit 147 updates the estimated required time by the equation (2) described above, for example, in accordance with a change of the position of the subject vehicle (the progress degree of the movement) (Step S108). The estimated required time updated in Step S108 is the estimate value of a remaining time until the subject vehicle halfway through starting completes the starting.

The obstacle detection unit 11 confirms an presence or absence of the obstacle based on the video taken by the surround camera 1 (Step S109). At this time, when there is the obstacle (YES in Step S110), the obstacle detection unit 11 further calculates the position and velocity vector of the obstacle, and confirms whether or not the obstacle moves toward the subject vehicle (Step S111).

When the obstacle moves toward the subject vehicle (YES in Step S111), the collision time estimation unit 13 calculates the estimated collision time based on the moving vector of the obstacle and the position of the required space (Step S112). When the obstacle is not detected (NO in Step S110) and when the obstacle does not move toward the subject vehicle (NO in Step S111), the collision time estimation unit 13 considers the estimated collision time to have an infinite value (Step S113).

Next, the start margin calculation unit 15 calculates the start margin by the equation (3) described above in accordance with the estimated required time calculated (updated) in Step S108 and the estimated collision time calculated in Step S112 or S113 (Step S114). Then, the notification processing unit 16 notifies the driver of the start margin using the display device 4 and the audio output device 5 (Step S115).

Subsequently, the start completion detection unit 142 detects whether or not the position of the subject vehicle reaches the start completion position, thereby confirming whether or not the subject vehicle enters the start completion state (Step S116). When the starting of the subject vehicle is not completed (NO in Step S116), the processing returns to Step S108.

When the starting of the subject vehicle is completed (YES in Step S116), the start completion detection unit 142 outputs the start completion signal, and in accordance with this, the required time measurement unit 143 finishes the measurement of the required time (Step S117). That is to say, the required time measured in the starting at this time is equal to a time from the execution of Step S103 to the execution of Step S117.

Finally, the start margin calculation unit 15 stores the measured required time in association with the driver specified in Step S105 and the start position specified in Step S106 (Step S118), and the flow in FIG. 9 is finished.

According to the drive assistance device 10 of the present embodiment described above, the driver is notified of the start margin calculated from the estimated required time and the estimated collision time at the time of starting the subject vehicle. For example, in a case where the driver is an inexperienced beginner or the driver starts the vehicle at a position unfamiliar to the driver, the driver is notified of the start margin which is estimated low in advance, thus an unexpected alarm and vehicle brake are suppressed. As a result, a mental and physical burden imposed on the driver and the passenger is reduced.

Figure 10:
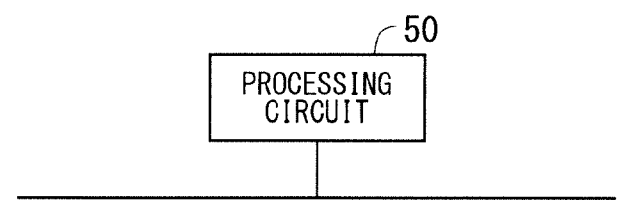
FIG. 10 A drawing illustrating an example of a hardware configuration of the drive assistance device.

FIGS. 10 and 22 are drawings each illustrating an example of a hardware configuration of the drive assistance device 10. Each element of the drive assistance device 10 illustrated in FIG. 1 is achieved by a processing circuit 50 illustrated in FIG. 10, for example. That is to say, the processing circuit 50 includes the required space estimation unit 12 estimating the required space which is the space required for the subject vehicle to complete the starting at the time of starting the subject vehicle; the required time estimation unit 14 calculating the estimated required time which is the estimate value of the time required for the subject vehicle to complete the starting at the time of starting the subject vehicle; the obstacle detection unit 11 detecting the obstacle around the subject vehicle; the collision time estimation unit 13 calculating the estimated collision time which is the estimate value of the time until when the obstacle reaches the required space; the start margin calculation unit 15 calculating the start margin indicating the temporal margin for the subject vehicle to complete the starting until the obstacle reaches the required space based on the estimated required time and the estimated collision time; and the notification processing unit 16 notifying the driver of the subject vehicle of the start margin. Dedicated hardware may be applied to the processing circuit 50, or a processor (also referred to as a central processing unit (CPU), a processing device, an arithmetic device, a microprocessor, a microcomputer, or a digital signal processor (DSP)) executing a program stored in a memory may also be applied.

When the processing circuit 50 is the dedicated hardware, a single circuit, a complex circuit, a programmed processor, a parallel-programmed processor, an application specific integrated circuit (ASIC), a field-programmable gate array (FPGA), or a combination of them, for example, falls under the processing circuit 50. Each function of the elements of the drive assistance device 10 may be achieved by the plurality of processing circuits, or each function of them may also be collectively achieved by one processing circuit.

Figure 11:
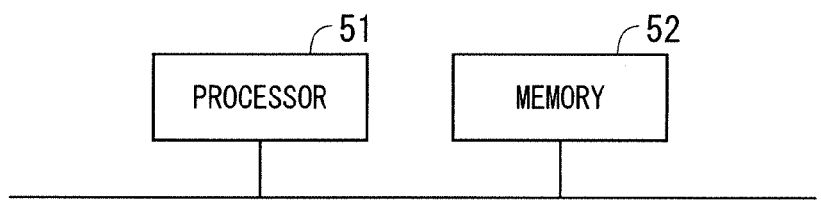
FIG. 11 A drawing illustrating an example of a hardware configuration of the drive assistance device.

FIG. 11 illustrates a hardware configuration of the drive assistance device 10 in a case where the processing circuit 50 is made up of a processor. In this case, each function of the elements of the drive assistance device 10 is achieved by a combination with software (software, firmware, or software and firmware), for example. The software, for example, is described as a program and is stored in a memory 52. The processor 51 as the processing circuit 50 reads out and executes the program stored in the memory 52, thereby achieving the functions of each unit. That is to say, the drive assistance device 10 includes the memory 52 to store the program to resultingly execute, at a time of being executed by the processing circuit 50, processing of: estimating the required space which is the space required for the subject vehicle to complete the starting; calculating the estimated required time which is the estimate value of the time required to complete the starting of the subject vehicle; detecting the obstacle around the subject vehicle; calculating the estimated collision time which is the estimate value of the time until when the obstacle reaches the required space; calculating the start margin indicating the temporal margin for the subject vehicle to complete the starting until the obstacle reaches the required space based on the estimated required time and the estimated collision time, and controlling the traveling of the subject vehicle based on the start margin. In other words, this program is also deemed to make a computer execute a procedure or a method of the operation of each element of the drive assistance device 10.

Herein, the memory 52 may be a non-volatile or volatile semiconductor memory such as a RAM (Random Access Memory), a ROM (Read Only Memory), a flash memory, an EPROM (Electrically Programmable Read Only Memory), or an EEPROM (Electrically Erasable Programmable Read Only Memory), an HDD (Hard Disk Drive), a magnetic disc, a flexible disc, an optical disc, a compact disc, a mini disc, a DVD (Digital Versatile Disc), or a drive device of them, or any storage medium which is to be used in the future.

Described above is the configuration that each function of the elements of the drive assistance device 10 is achieved by one of the hardware and the software, for example. However, the configuration is not limited thereto, but also applicable is a configuration of achieving a part of the elements of the drive assistance device 10 by dedicated hardware and achieving another part of them by software, for example. For example, the part of the elements can be achieved by a processing circuit 50 as the dedicated hardware, and the other part of the elements can be achieved by the processing circuit 50 as the processor 51 reading out and executing the program stored in the memory 52.

As described above, the drive assistance device 10 can achieve each function described above by the hardware, the software, or the combination of them, for example.

Embodiment 2

Figure 12:
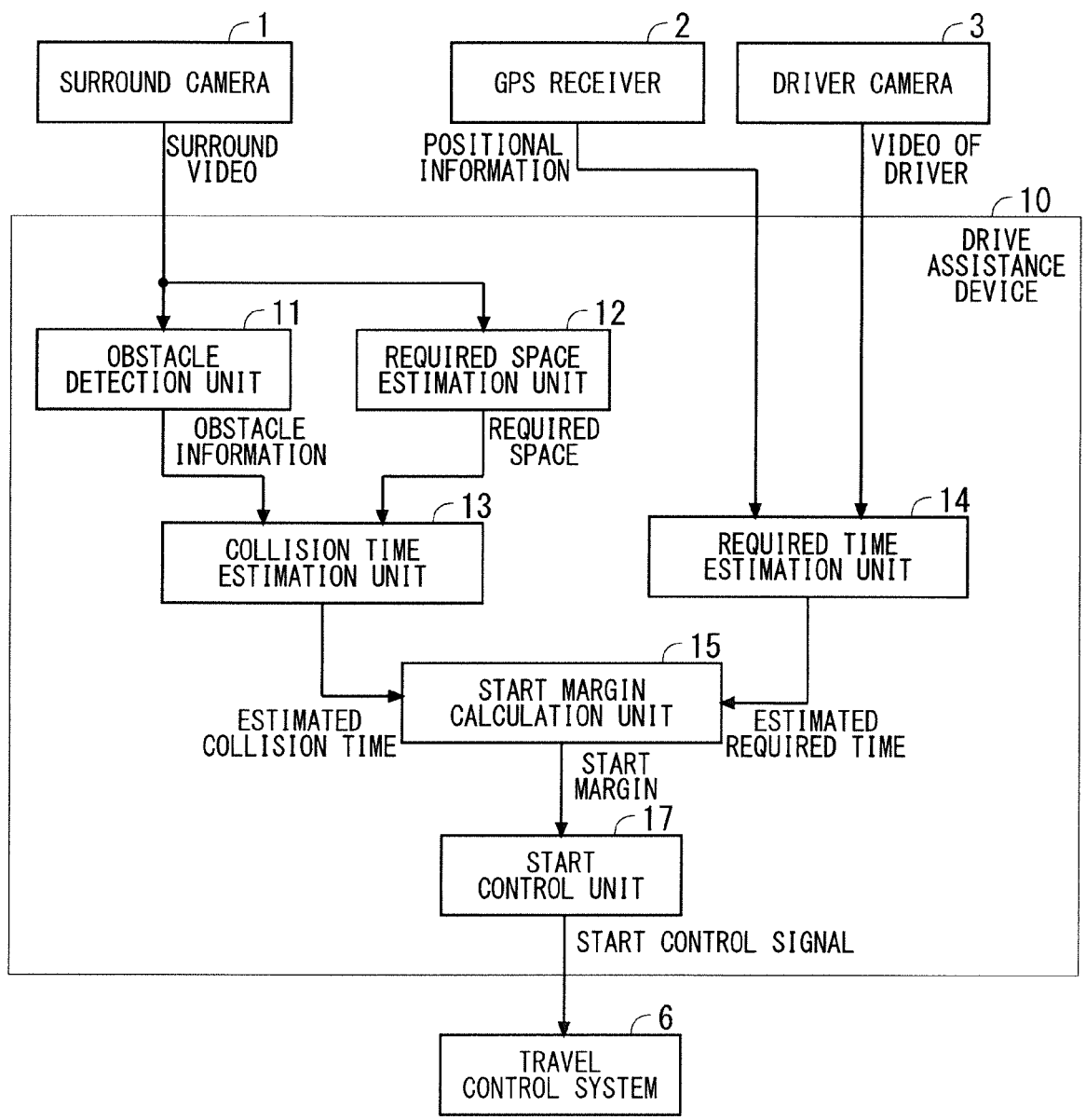
FIG. 12 A drawing illustrating a configuration of a drive assistance system including a drive assistance device according to an embodiment 2.

FIG. 12 is a drawing illustrating a configuration of a drive assistance system including a drive assistance device 10 according to an embodiment 2. The drive assistance device 10 illustrated in FIG. 12 has a configuration similar to that in FIG. 1 except that a start control unit 17 is provided in place of the notification processing unit 16. The drive assistance device 10 is connected to a travel control system 6 controlling an acceleration mechanism, a brake mechanism, and a steering mechanism of the subject vehicle. The other elements are similar to those illustrated in FIG. 1.

The start control unit 17 outputs a start control signal for controlling a start operation of the subject vehicle to the travel control system 6 based on the start margin calculated by the start margin calculation unit 15. For example, the start control unit 17 controls the travel control system 6 so that the start operation of the subject vehicle is suppressed when the start margin is equal to or smaller than a predetermined threshold value (for example, equal to or smaller than −2 seconds). The control of suppressing the start operation of the subject vehicle is preferably the brake control of reducing a speed of the subject vehicle or stopping the subject vehicle, however, also applicable is the steering control of changing a traveling direction of the subject vehicle to avoid the collision with the obstacle when there is a sufficient space for retracting the subject vehicle.

Figure 13:
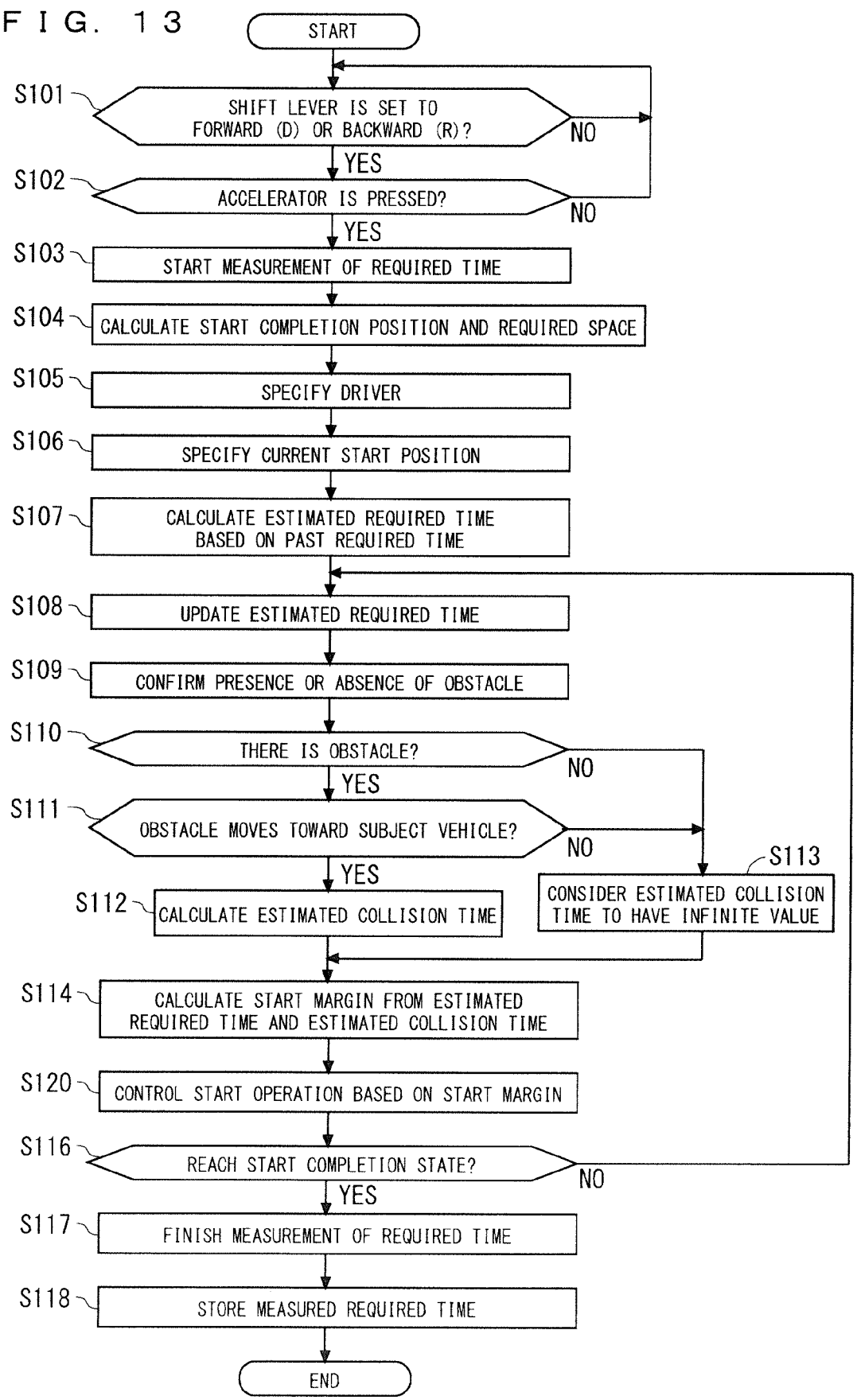
FIG. 13 A flow chart illustrating an operation of the drive assistance device according to the embodiment 2.

FIG. 13 is a flow chart illustrating an operation of the drive assistance device according to the embodiment 2. The flow in FIG. 13 is similar to the flow in FIG. 9 except that Step S115 in FIG. 9 is replaced with Step S120 in which the start control unit 17 controls the start operation of the subject vehicle based on the start margin. The other steps are similar to those illustrated in FIG. 9.

According to the drive assistance device 10 of the present embodiment, the start operation of the subject vehicle is controlled in accordance with the start margin calculated from the estimated required time and the estimated collision time at the time of starting the subject vehicle. For example, when the start margin is small and there is a possibility of collision of the obstacle with the subject vehicle, the start operation of the subject vehicle is suppressed, thus the collision can be avoided. In the case where the driver is the inexperienced beginner or the driver starts the vehicle at the position unfamiliar to the driver, the start margin is estimated low, thus the control with the sufficient margin is performed. Thus, the control such as a sudden braking performed by the travel control system 6 during the start operation of the subject vehicle can be avoided, and the mental and physical burden imposed on the driver and the passenger is reduced.

Figure 14:
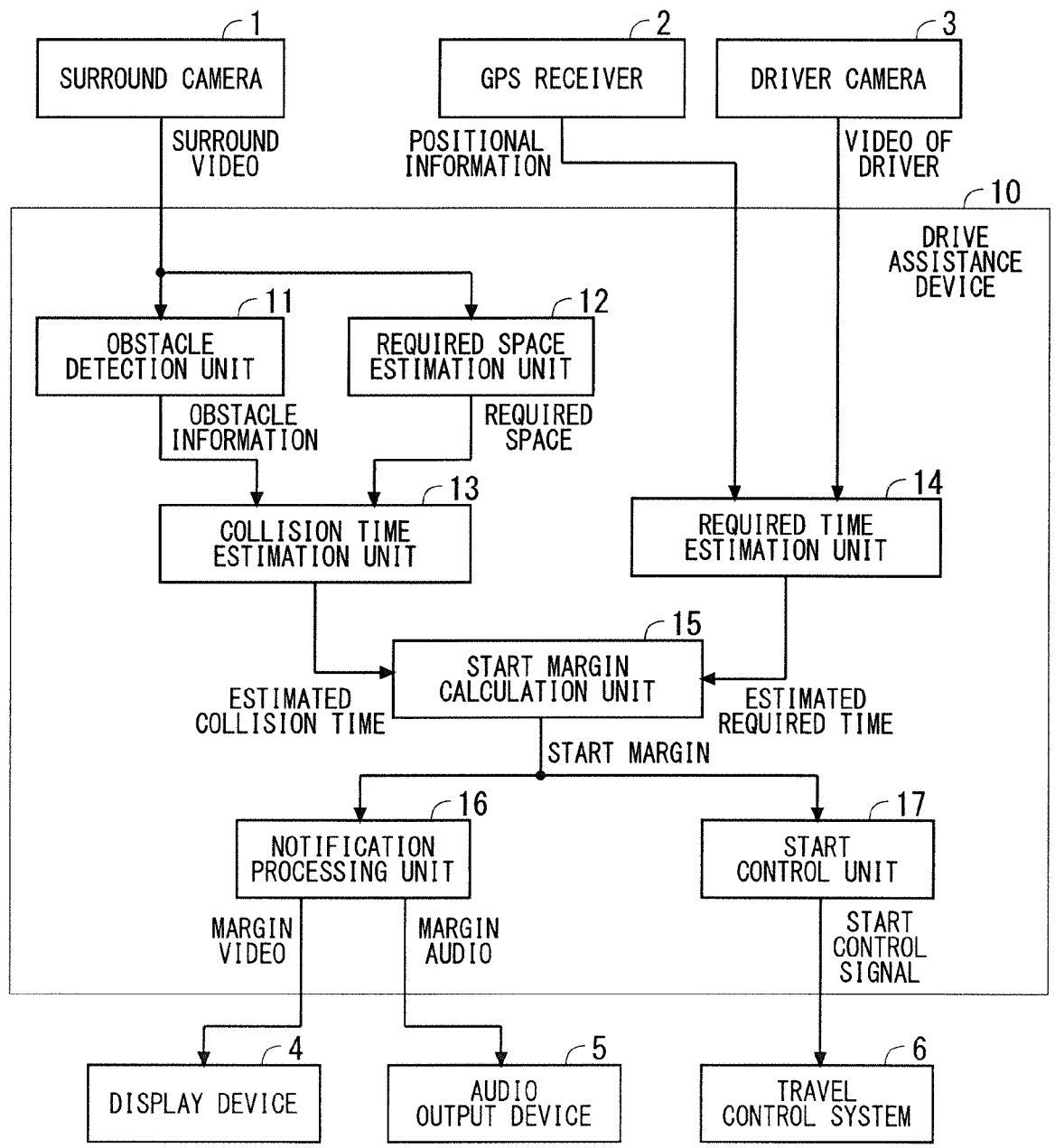
FIG. 14 A drawing illustrating a modification example of the drive assistance device according to the embodiment 2.

FIG. 12 illustrates the configuration in which the start control unit 17 is provided in place of the notification processing unit 16 in FIG. 1, however, both the notification processing unit 16 and the start control unit 17 may be provided in the drive assistance device 10 as illustrated in FIG. 14. That is to say, the embodiment 2 can be combined with the embodiment 1.

According to the present invention, each embodiment can be arbitrarily combined, or each embodiment can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

Explanation of Reference Signs

1 surround camera, 2 GPS receiver, 3 driver camera, 4 display device, 5 audio output device, 6 travel control system, 10 drive assistance device, 11 obstacle detection unit, 12 required space estimation unit, 13 collision time estimation unit, 14 required time estimation unit, 15 start margin calculation unit, 16 notification processing unit, 17 start control unit, 141 starting detection unit, 142 start completion detection unit, 143 required time measurement unit, 144 start position specifying unit, 145 driver specifying unit, 146 past required time storage unit, 147 estimated required time calculation unit, 161 margin image generation unit, 162 image synthesizing unit, 163 margin audio generation unit, 100 subject vehicle, 101 parking slot, 111 obstacle, 112 non-subject vehicle

The invention claimed is:

1. A drive assistance device, comprising:
a memory to store a program; and
a processor which, by executing the program, is configured to:
estimate a required space which is a space required for a subject vehicle to complete a starting at a time of starting the subject vehicle;
based on positional information of the subject vehicle and a past required time for a current driver to complete the starting of the subject vehicle, calculate an estimated required time which is an estimate value of a time required for the current driver of the subject vehicle to complete the starting at the time of starting the subject vehicle, said past required time being determined on the basis of plural past starting incidences and being weighted by recency of the incidence;
detect an obstacle around the subject vehicle based on sensing data provided by a sensor;
calculate an estimated collision time which is an estimate value of a time until the obstacle reaches the required space;
calculate a start margin indicating a temporal margin for the subject vehicle to complete the starting until the obstacle reaches the required space based on the estimated required time and the estimated collision time;
provide a notification to the current driver of the subject vehicle of the start margin, wherein the notification is configured to indicate the start margin as a magnitude on a gauge; and
control an operation of the starting of the subject vehicle based on the start margin,
wherein the processor is further configured to:
based on the subject vehicle not reaching a completion of the starting of the subject vehicle, recalculate the estimated required time, recalculate the estimated collision time, and recalculate the start margin based on the recalculated estimated required time and the recalculated estimated collision time, and
based on a value of the start margin being changed, provide an updated notification to the current driver based on the recalculated start margin.

2. The drive assistance device according to claim 1, wherein
the processor displays an image indicating the start margin in a display device.

3. The drive assistance device according to claim 1, wherein
the processor makes an audio output device output an audio indicating the start margin.

4. The drive assistance device according to claim 1, wherein
the processor detects the obstacle using a camera, a milliwave radar, or a sonar mounted on the subject vehicle.

5. The drive assistance device according to claim 1, wherein
the processor measures an actual required time which is a time required for the subject vehicle to actually start and controls a storage to store actual required times which have been previously measured.

6. The drive assistance device according to claim 5, wherein
the processor specifies a current driver of the subject vehicle and controls the storage to retrieve the required times which have been previously measured for the current driver, and
the processor calculates the estimated required time based on the required times which have been previously measured on the current driver.

7. The drive assistance device according to claim 5, wherein
the processor specifies a position where the subject vehicle starts and controls the storage to store the required time which has been previously measured for each position, and
the processor calculates the estimated required time based on the required time which has been previously measured in a position where the subject vehicle is currently to start.

8. The drive assistance device of claim 1, wherein a larger value of start margin indicates a lower start riskiness, and the start margin is lower the less an experience level of a driver.

9. The drive assistance device of claim 1, wherein the magnitude indicates a magnitude of start riskiness.

10. The drive assistance device of claim 1, wherein the gauge comprises a first gauge associated with a left side of the subject vehicle and a second gauge associated with a right side of the subject vehicle.

11. A drive assistance device, comprising:
a memory to store a program; and
a processor which, by executing the program, is configured to:
estimate a required space which is a space required for a subject vehicle to complete a starting at a time of starting the subject vehicle;
based on positional information of the subject vehicle and a past required time for a current driver of the subject vehicle to complete the starting of the subject vehicle, calculate an estimated required time which is an estimate value of a time required for the current driver of the subject vehicle to complete the starting at the time of starting the subject vehicle, said past required time being determined on the basis of plural past starting incidences and being weighted by recency of the incidence, wherein the past required times for the current driver are stored in a storage;
detect an obstacle around the subject vehicle based on sensing data provided by a sensor;
calculate an estimated collision time which is an estimate value of a time until the obstacle reaches the required space;
calculate a start margin indicating a temporal margin for the subject vehicle to complete the starting until the obstacle reaches the required space based on the estimated required time and the estimated collision time;
provide a notification to the current driver of the subject vehicle of the start margin, wherein the notification is configured to indicate the start margin as a magnitude on a gauge;

control an operation for the starting of the subject vehicle based on the start margin;
based on detecting a completion of the starting of the subject vehicle, calculate an actual required time that was required for the current driver to complete the starting of the subject vehicle; and
update, in the storage, the past required time based on the actual required time,
wherein the processor is further configured to:
based on the subject vehicle not reaching a completion of the starting of the subject vehicle, recalculate the estimated required time, recalculate the estimated collision time, and recalculate the start margin based on the recalculated estimated required time and the recalculated estimated collision time, and
based on a value of the start margin being changed, control the operation for the starting of the subject vehicle based on the recalculated start margin.

12. The drive assistance device according to claim 11, wherein
the processor detects the obstacle using a camera, a milliwave radar, or a sonar mounted on the subject vehicle.

13. The drive assistance device according to claim 11, wherein
the processor specifies a current driver of the subject vehicle and controls the storage to store the required time which has been previously measured for the current driver, and
the processor calculates the estimated required time based on the required times which have been previously measured on the current driver.

14. The drive assistance device according to claim 11, wherein
the processor specifies a position where the subject vehicle starts and controls the storage to store the required time which has been previously measured for each position, and
the processor calculates the estimated required time based on the required time which has been previously measured in a position where the subject vehicle is currently to start.

15. A drive assistance method, comprising:
estimating a required space which is a space required for a subject vehicle to complete a starting of the subject vehicle at a time of starting the subject vehicle;
determining a specific driver as a current driver;
based on positional information of the subject vehicle and a past required time for the current driver to complete the starting of the subject vehicle, calculating an estimated required time which is an estimate value of a time required for the subject vehicle to complete the starting of the subject vehicle, based upon past performance of the current driver, said past required time being determined on the basis of plural past starting incidences and being weighted by recency of the incidence;
detecting an obstacle around the subject vehicle;
calculating an estimated collision time which is an estimate value of a time until the obstacle reaches the required space;
calculating a start margin indicating a temporal margin for the subject vehicle to complete the starting until the obstacle reaches the required space based on the estimated required time and the estimated collision time;
providing a notification to the current driver of the subject vehicle of the start margin, wherein the notification is configured to indicate the start margin as a magnitude on a gauge; and
controlling an operation for the starting of the subject vehicle based on the start margin,
wherein the drive assistance method further comprises:
based on the subject vehicle not reaching a completion of the starting of the subject vehicle, recalculating the estimated required time, recalculating the estimated collision time, and recalculating the start margin based on the recalculated estimated required time and the recalculated estimated collision time, and
based on a value of the start margin being changed, providing an updated notification to the current driver based on the recalculated start margin.

16. A drive assistance method, comprising:
estimating a required space which is a space required for a subject vehicle to complete a starting of the subject vehicle at a time of starting the subject vehicle;
based on positional information of the subject vehicle and a past required time for a current driver of the subject vehicle to complete the starting of the subject vehicle, calculating an estimated required time which is an estimate value of a time required for the current driver of the subject vehicle to complete the starting of the subject vehicle, said past required time being determined on the basis of plural past starting incidences and being weighted by recency of the incidence, wherein the past required times for the current driver are stored in a storage;
detecting an obstacle around the subject vehicle;
calculating an estimated collision time which is an estimate value of a time until the obstacle reaches the required space;
calculating a start margin indicating a temporal margin for the subject vehicle to complete the starting until the obstacle reaches the required space based on the estimated required time and the estimated collision time;
providing a notification to the current driver of the subject vehicle of the start margin, wherein the notification is configured to indicate the start margin as a magnitude on a gauge;
controlling a traveling of the subject vehicle based on the start margin;
based on detecting a completion of the starting of the subject vehicle, calculating a present actual required time that was required for the current driver to complete the starting of the subject vehicle; and
updating, in the storage, the current driver's past required times by adding the present actual required time in the storage,
wherein the drive assistance method further comprises:
based on the subject vehicle not reaching a completion of the starting of the subject vehicle, recalculating the estimated required time, recalculating the estimated collision time, and recalculating the start margin based on the recalculated estimated required time and the recalculated estimated collision time, and
based on a value of the start margin being changed, controlling the traveling of the subject vehicle based on the recalculated start margin.

* * * * *